(12) United States Patent
Etherton et al.

(10) Patent No.: US 7,019,073 B2
(45) Date of Patent: Mar. 28, 2006

(54) METHOD FOR PREPARING CYCLODEXTRIN-POLYOLEFIN BLENDS AND PRODUCTS MADE THEREFROM

(75) Inventors: Bradley P. Etherton, Cincinnati, OH (US); Douglas C. McFaddin, Cincinnati, OH (US)

(73) Assignee: Equistar Chemicals, L.P., Houston, TX (US)

( * ) Notice: Subject to any disclaimer, the term of this patent is extended or adjusted under 35 U.S.C. 154(b) by 60 days.

(21) Appl. No.: 10/644,347

(22) Filed: Aug. 20, 2003

(65) Prior Publication Data
US 2005/0043482 A1    Feb. 24, 2005

(51) Int. Cl.
*C08G 61/00* (2006.01)

(52) U.S. Cl. ........................ 525/54.2; 525/64
(58) Field of Classification Search .............. 525/54.2, 525/64
See application file for complete search history.

(56) References Cited

U.S. PATENT DOCUMENTS

| | | | |
|---|---|---|---|
| 5,209,977 A | 5/1993 | Heimberg et al. | |
| 5,246,779 A | 9/1993 | Heimberg et al. | |
| 5,336,731 A | 8/1994 | Ondrus et al. | |
| 5,714,445 A * | 2/1998 | Trinh et al. | 510/103 |
| 5,776,842 A | 7/1998 | Wood et al. | |
| 5,837,339 A | 11/1998 | Wood et al. | |
| 5,882,565 A | 3/1999 | Wood et al. | |
| 5,883,161 A | 3/1999 | Wood et al. | |
| 5,928,745 A | 7/1999 | Wood et al. | |
| 5,985,772 A | 11/1999 | Wood et al. | |
| 6,136,354 A | 10/2000 | Wood et al. | |
| 6,218,013 B1 | 4/2001 | Wood et al. | |
| 6,306,936 B1 | 10/2001 | Wood et al. | |
| 6,380,320 B1 | 4/2002 | Wong | |
| 2003/0113525 A1 | 6/2003 | Wood et al. | |
| 2004/0110901 A1 | 6/2004 | Wood et al. | |

FOREIGN PATENT DOCUMENTS

| | | |
|---|---|---|
| EP | 0 483 380 A | 5/1992 |
| JP | 3273036 A | 3/1992 |

OTHER PUBLICATIONS

Grafting of Cyclodextrins onto Polypropylene Nonwoven Fabrics for the Manufacture of Reactive Filters. I Synthesis Parameters, Philippe Le Thuaut et al., Journal of Applied Polymer Science, vol. 77, pp. 2118-2125 (2000).

* cited by examiner

*Primary Examiner*—Jeffrey Mullis
(74) *Attorney, Agent, or Firm*—Brooks Kushman P.C.

(57) ABSTRACT

The present invention discloses a method of dispersing cyclodextrins into a base polymer. The method of the invention comprises reacting grafted microfine polymer powder with a cyclodextrin to form a cyclodextrin-attached grafted polymer, and mixing the cyclodextrin-attached grafted polymer and the base polymer for a sufficient time that the cyclodextrin-attached grafted polymer is dispersed within the base polymer. The present invention also provides several cyclodextrin-inclusion complex products formed by the method of the invention. This products include an antimicrobial polymer blend, a fragrant polymer blend, and a dyed polymer blend.

14 Claims, No Drawings

METHOD FOR PREPARING CYCLODEXTRIN-POLYOLEFIN BLENDS AND PRODUCTS MADE THEREFROM

BACKGROUND OF THE INVENTION

1. Field of the Invention

The present invention relates to methods of dispersing cyclodextrins into polyolefins and to the products made from polyolefins containing cyclodextrins dispersed by this method.

2. Background Art

Cyclodextrins are cyclic, polymeric sugars which have a truncated conical shape and a hollow interior. The interior cavity is relatively hydrophobic compared to the hydrophilic exterior which bears many hydroxyl groups. The size of the cavity depends upon the number of glucose units (typically ranging from 6 to 12 units) in the cyclodextrin ring. Diameters vary from about 5 Å for α-cyclodextrin (6 glucose units) up to about 8 Å for γ-cyclodextrin (8 glucose units). Correspondingly, the interior volumes range from about 170 $Å^3$ to about 430 $Å^3$. A significant amount of low molecular weight material can occupy the cavity. Cyclodextrins typically form inclusion complexes with 1:1 or 1:2 stoichiometry depending upon the low molecular weight substrate. They are useful as adsorbents for odors, flavors, dyes, etc., as well as being useful as carriers for material such as perfumes, fabric softeners, antibiotics, dyes, inks, etc.

There has been significant interest in putting cyclodextrins into or onto polymeric materials for such varied applications as removing odors from inanimate surfaces, adsorbing undesirable flavor components, and improving polymer barrier properties. (See, for example, U.S. Pat. Nos. 5,776,842, 5,837,339, 5,882,565, 5,883,161, 5,928,745, 5,985,772, 6,136,354, 6,218,013 and 6,306,936.) The mechanism by which cyclodextrins improve the barrier properties of polymers involves non-steady state diffusion. Cyclodextrins reversibly adsorb a permeant when it begins to penetrate a polymer film. As the permeant adsorbs and desorbs in the cyclodextrins, the apparent permeant concentration is temporarily higher than it would be at steady state. Such non-steady state behavior slows the permeation rate making it appear that the film has improved barrier properties. While this example illustrates the ability of cyclodextrins to capture small molecules, there are other examples in which cyclodextrins in a polymeric matrix deliver small molecular species. For example, there are fibers that release anti-microbials, fabrics that release fabric softeners while in a dryer, and films that release perfumes to mask odors.

Cyclodextrins are difficult to disperse in polyolefins because typically cyclodextrins are powders with hydrophilic surfaces. In particular, cyclodextrins tend to agglomerate without any surface treatment. Such agglomeration has a deleterious effect on the mechanical properties of the polymer and also reduces the effectiveness of the cyclodextrin to function as an adsorbent or carrier.

Recently, cyclodextrins have been grafted onto polypropylene modified by electron-beam grafting of glycidyl methacrylate ("GMA"). The cyclodextrin is grafted when hydroxyls on its surface react with the epoxides of the grafted GMA (*J. Appl. Polym. Sci.* (2000), 77(10), 2118–2125). However, electron-beam modification is not a feasible process for commercial production of cyclodextrin derivatized polypropylene because of the expense associated with this process.

Accordingly, there exists a need for improved methods of dispersing cyclodextrins in polymers, and, in particular, into hydrophobic polymers such as polyolefins.

SUMMARY OF THE INVENTION

The present invention overcomes the problems encountered in the prior art by providing a method of dispersing cyclodextrins into a base polymer. The method of the invention comprises reacting a grafted microfine polymer powder with a cyclodextrin to form a cyclodextrin-attached grafted polymer; and dispersing the cyclodextrin-attached grafted polymer in the base polymer. The term "microfine" is intended to describe polymers that have particle sizes ranging from about 1 micron to about 500 microns, but with a wide range of morphologies. The preferred particles are spherical in nature. Typically, the microfine particles are such that 80 percent or more of the particles range in size from about 10 up to about 500 microns. However, the particle shapes can vary from spherical to oblong to irregular. The small particle size of the grafted microfine polymer powder ensures intimate mixing with the cyclodextrin and reduced agglomeration in the final product. By mixing the two powders this way, one obtains a uniform, high concentration of reactive groups (i.e., grafted maleic anhydride and hydroxyl on the cyclodextrin) in the melt. This maximizes the reaction between the two and grafts cyclodextrin onto the base polymer backbone. As the cyclodextrin-attached grafted polymer is blended into the base polymer, it carries the cyclodextrin with it and disperses it evenly throughout the polymer. In contrast, when feeding cyclodextrin powder to a melt containing both graft and base polymer, one obtains a high local concentration of cyclodextrin but low concentration of the grafted polymer.

In another embodiment of the present invention, a dispersed cyclodextrin-containing polymer is made by the methods of the invention. Specifically, the dispersed cyclodextrin-containing polymer is made by the process comprising reacting a grafted microfine polymer powder with a cyclodextrin inclusion complex to form a cyclodextrin-attached grafted polymer; and dispersing the cyclodextrin-attached grafted polymer in a base polymer.

In another embodiment of the present invention, the dispersed cyclodextrin-attached grafted microfine polymers of the present invention are used to form dyeable polyolefin fibers. In this embodiment, a fiber is first formed from the dispersed cyclodextrin-attached grafted microfine polymer. Next, the fiber is passed through a dye bath wherein the cyclodextrin adsorbs the dye.

In still another embodiment of the present invention, the dispersed cyclodextrin-attached grafted microfine polymers of the present invention are used to prepare polymers with anti-microbial/anti-bacterial properties (i.e., the polymers have either anti-microbial or anti-bacterial properties). Such polymers are suitable for use in children's toys.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

In an embodiment of the present invention, a method of dispersing cyclodextrins into a base polymer is provided. The method of the invention comprises:

(a) reacting a grafted microfine polymer powder with a cyclodextrin to form a cyclodextrin-attached grafted polymer; and (b) dispersing the cyclodextrin-attached grafted polymer in a base polymer. The base polymer includes, for example, polyolefins, polystyrene, and mixtures thereof. More preferably, the base polymer is a homopolymer and copolymer of ethylene and propylene, a copolymer of ethylene and 1-olefins such as propylene, 1-butene, 1-hexene, 1-octene, and 4-methyl-1-pentene, etc., a copolymer of propylene and 1-olefins such as ethylene, 1-butene, 1-hexene, etc., and mixtures thereof. Most preferably, the base polymer is a homopolymer and copolymer of ethylene and propylene. Suitable examples of base polymers are high density polyethylenes such as Alathon® M6210 (a medium molecular weight ethylene-octene copolymer), Alathon® M5040 or Alathon® H5012 (an injection molding grade high density polyethylene), ethylene-1-butene copolymers such as Equistar GA501 (a linear low density polyethylene), low density polyethylene such as Equistar NA204 or NA214, polypropylenes such as Equistar PP8001LK, propylene-ethylene random copolymers such as Equistar PP33HFO4, ethylene-propylene elastomers such as Bayer BUNA® EPT2070 or Exxon Vistalon® 878, and ethylene-butene plastomers such as Exxon Exxact 4033.

In performing the mixing step, about 1% by weight to about 30% by weight of a cyclodextrin-attached grafted polymer and about 99% by weight to about 70% of the base polymer are combined together. Suitable equipment for performing the mixing includes, but is not limited to, a V-blender, a double-cone blender, a Henschel mixer, a twin screw extruder, and a single screw extruder. About 1% to about 30% cyclodextrin powder is mixed with 99% to about 70% microfine grafted polymer powder. Suitable powder mixing equipment includes for example V-blenders, double core blenders, Henschel mixers, and the like. After the powders are thoroughly mixed, the cyclodextrin-attached grafted microfine polymer powder is transferred to melt compounding equipment such as a single screw extruder, twin screw extruder, Banbury mixer, Buss kneader, etc. This mixing will preferably be performed at a sufficient temperature to melt the grafted microfine powder. The resulting cyclodextrin-grafted polymer pellets can then be mixed with pellets of the base polymer prior to preparing the finished article. Alternatively, the powders can be mixed and then added to pellets of the base polymer wherein all components can be compounded together. Alternatively, one can melt the base polymer and add the mixed powders to the melt. The mixing step will preferably be performed at a sufficient temperature to melt the grafted microfine polymer. In the case of polyethylene, this temperature can be relatively low, from about 130° to about 200° C. (about 260° to about 400° F.)

The grafted microfine polymer powder used in the method of the present invention comprises a microfine polymer onto which an ethylenically unsaturated monomer has been grafted. The ethylenically unsaturated monomer will include a functional group which can react with the cyclodextrin. Such functional groups include, for example, silanes, acids, epoxides, and the like. Suitable monomers include, but are not limited to, unsaturated carboxylic acids, unsaturated carboxylic acid derivatives, unsaturated alkoxy silanes, and mixtures thereof. Examples of unsaturated carboxylic acids are acrylic acid, methacrylic acid, maleic acid, fumaric acid, itaconic acid, citraconic acid, and the like. Examples of unsaturated carboxylic acid derivatives include, but are not limited to, unsaturated carboxylic acid anhydrides such as maleic anhydride, methyl maleic anhydride, dimethyl maleic anhydride or citraconic anhydride, nadic anhydride, nadic methyl anhydride, himic anhydride, methyl himic anhydride, and 4-methylcyclohex-4-ene-1,2-dicarboxylic acid anhydride. Other derivatives of unsaturated carboxylic acids include esters, amides, acid chlorides, and the like. Specific examples of unsaturated carboxylic acid derivatives include epoxy-containing esters such as glycidyl acrylate, glycidyl methacrylate, etc., half esters of difunctional acids such as maleic acid monoethyl ester, maleic acid monoethyl ester, fumaric acid monoethyl ester, fumaric acid dimethyl ester, itaconic acid monomethyl ester, half amides of difunctional acids such as maleic acid monoamide, maleic acid-N-monoethyl amide, maleic acid-N-monobutyl amide, fumaric acid monoamide, fumaric acid-N-monoethylamide, fumaric acid-N-monobutylamide. Finally, examples of unsaturated alkoxy silanes include, but are not limited to, vinyl silanes such as vinyl trimethoxy silane and vinyl triethoxy silane. More preferably, the ethylenically unsaturated monomer is a cyclic unsaturated carboxylic acid anhydride such as a maleic anhydride. Particularly preferred grafted polymers for use in the method of the invention are maleic anhydride ("MAH") grafted polyolefins which are known and, most commonly, are grafted ethylene or propylene homopolymers or copolymers. As used herein, grafting denotes covalent bonding of the MAH to the polymer chain. Such MAH grafted polyolefins may be prepared in solution, in a fluidized bed reactor, by melt grafting or by irradiation grafting. Particularly useful grafted polyolefins for the invention are conveniently prepared by melt grafting, i.e., by reacting the MAH and polyolefin in the substantial absence of a solvent. This is generally accomplished in a shear-imparting reactor, such as an extruder/reactor. Twin screw extruder/reactors such as those marketed by Coperion (formerly Werner-Pfleiderer) under the designations ZSK-53, ZSK-83 and ZSK-92 are commonly used. A free radical generating catalyst, such as a peroxide catalyst, can be employed but is not necessary.

The microfine powders used in the method of the present invention are preferably prepared by adapting the various micronization techniques known in the art to form spherical or substantially spherical particles. For example U.S. Pat. Nos. 5,246,779, 5,336,731 and 5,209,977 each disclose processes for micronizing polymer. Each of these patents is hereby incorporated by reference. For example, the grafted microfine polymer powders may be made by the process comprising:

(a) heating a mixture comprising a carboxylic acid-functionalized polyolefin, a nonionic surfactant, and a polar liquid medium containing at least 50 wt. % water to a temperature above the melting point of the polyolefin to form a dispersion of liquified polyolefin in the polar liquid medium; and (b) cooling the dispersion below the melting point of the polyolefin to produce a carboxylic acid-functionalized polyolefin powder.

The microfine particles can also be prepared by size reduction processes such as grinding. However, this tends to produce irregular small particles which are not as preferable as spheres. Extremely irregular particles such as needles or plates are not preferred, although the invention will still work if they are used.

The grafted polymer is preferably a grafted polyolefin. Moreover, the weight ratio of polar liquid medium to grafted polyolefin is from 1:1 to 9:1 and the weight ratio of nonionic surfactant to grafted polyolefin is from 0.05:1 to 5:1. More preferably, the grafted polyolefin is a polyethylene grafted with from about 0.5 to about 5 wt. % maleic anhydride and the nonionic surfactant is a block copolymer of ethylene oxide and propylene oxide. Most preferably, the grafted polyethylene is high density polyethylene (HDPE) or linear low density polyethylene (LLDPE) grafted with from about 1 to about 4 wt. % maleic anhydride. The grafted HDPE and LLDPE have a melt index (MI) from 5 to 2000 g/10 min. determined in accordance with ASTM D1238-01, condition 190/2.16. The nonionic surfactant contains at least 50% ethylene oxide and has a molecular weight of at least 4500. Preferably the nonionionic surfactant contains about 80% ethylene oxide and about 20% propylene oxide and has a molecular weight of about 11,250 to about 16,250.

In another embodiment of the present invention, a dispersed cyclodextrin-containing polymer is made by the methods set forth above. For example, the dispersed cyclodextrin-containing polymer is made by the process comprising:

(a) reacting a grafted microfine polymer powder with a cyclodextrin inclusion complex to form a cyclodextrin-attached grafted polymer; and (b) dispersing the cyclodextrin-attached grafted polymer in a base polymer. The selection of the base polymer, the polyolefin, and percentages are the same as set forth above for the methods of the invention. In particular, the base polymer is selected from the group consisting of polyolefins, polystyrene, and mixtures thereof; and the polyolefin is selected from the group consisting of homopolymers and copolymers of ethylene and propylene. Similarly, from about 1 to about 30 percent by weight of the cyclodextrin-attached grafted polymer is dispersed in from about 99 to about 70 percent by weight of the base polymer.

In another embodiment of the present invention the dispersed cyclodextrins set forth above are used to form dyeable polyolefin fibers, in particular dyeable polypropylene fibers. In this embodiment, a cyclodextrin absorbs a dye to form a cyclodextrin-dye inclusion complex. The cyclodextrin-dye inclusion complex is then attached to a grafted polymer (preferably, a polyolefin) as set forth above and dispersed to form a dispersed cyclodextrin-dye inclusion complex. The dispersed cyclodextrin-dye inclusion complex may then be molded by techniques known in the art (e.g., extrusion). Specifically, fibers may be formed from the dispersed cyclodextrin-dye inclusion complex. The dispersed cyclodextrin-dye inclusion complex can be used as a monofilament fiber or as the outer layer of a bi-component fiber.

Dyes useful in this embodiment will be relatively hydrophobic, have very high equilibrium constants for complexation to cyclodextrin at room temperature, and have high boiling points and low volatility. They will have intense colors such that they impart color to the finished article even when substantially diluted. Highly water-soluble dyes will not tend to form inclusion complexes with the hydrophobic cyclodextrin cavities. Inclusion complexes with very high equilibrium constants (strong binding) are favored since it is desirable for the dye to remain complexed to the cyclodextrin throughout the course of grafting and subsequent finishing of the article. Dyes with low equilibrium constants (very weak binding) will not be useful since free dye will migrate to the surface of the finished article where it can transfer to other surfaces during handling. Suitable dyes useful in this invention include, but are not limited to, azo disperse dyes and anthraquinone dyes which form inclusion complexes with cyclodextrins. Examples include such disperse azo dyes as Disperse Yellow 7 (C.I. 26090; 4-[4-(phenylazo)phenylazo]-o-cresol), Disperse Orange 13 (C.I. 26080; 4-[4-(phenylazo)-1-naphthylazo]phenol), Disperse Red 1 (C.I. 11110), and such disperse anthraquinone dyes as Disperse Blue 3 (C.I. 61505).

In another embodiment of the present invention, the cyclodextrin-modified polymers made by the methods of the present invention are used to prepare polymer with anti-microbial/anti-bacterial properties. Such polymers are suitable for use in children's toys, packaging for cosmetics, food packaging, and other applications where an antimicrobial surface would be desirable. In this embodiment, a cyclodextrin absorbs a compound with anti-microbial and/or anti-bacterial properties to form a cyclodextrin-antimicrobial inclusion complex. The cyclodextrin-antimicrobial inclusion complex is then attached to a grafted polymer (preferably, a polyolefin) as set forth above and dispersed to form a dispersed cyclodextrin-antimicrobial inclusion complex. The dispersed cyclodextrin-antimicrobial inclusion complex may then be molded into a finished article by techniques known in the art (e.g., extrusion). In this case an inclusion complex of cyclodextrin and an anti-microbial would be incorporated in the polyolefin. The blend would then deliver small quantities of anti-microbial agent to the polymer surface for an extended period of time. Anti-microbial agents useful in this invention will be relatively hydrophobic, relatively non-volatile, and have moderately high room temperature equilibrium constants for complexation with cyclodextrin. Highly water-soluble anti-microbials will not tend to form inclusion complexes with cyclodextrins since the cyclodextrin cavities are relatively hydrophobic. Anti-microbials which are very volatile will evaporate during the preparation of the finished polymer article. Anti-microbial agents which form inclusion complexes with very high equilibrium constants (strong binding) or very low equilibrium constants (weak binding) will not be useful. Those with very weak binding will not form inclusion complexes to begin with. Those with very high equilibrium constants will not be able to leave the cavity, diffuse to the surface of the finished polymeric article, and provide anti-microbial benefits. Anti-microbials useful in this invention can be triclosan (5-chloro-2-(2,4-dichlorophenoxy)phenol), amyl-phenol, phenyl-phenol, benzyl-4-chlorophenol, short chain alkyl esters of p-hydroxybenzoic acid, 3,4,4'-trichlorocarbanilide, and the like.

In still another embodiment of the present invention, the dispersed cyclodextrins set forth above are used to form polymers with a fragrance. In this embodiment, a cyclodextrin absorbs a molecule with a fragrance to form a cyclodextrin-fragrance inclusion complex. The cyclodextrin-fragance inclusion complex is then attached to a grafted polymer (preferably, a polyolefin) as set forth above and dispersed to form a dispersed cyclodextrin-fragrance inclusion complex. The dispersed cyclodextrin-fragrance inclusion complex may then be molded into a finished article by techniques known in the art (e.g, extrusion). Fragrances useful in this invention will be relatively hydrophobic, have moderately high equilibrium constants for complexation to cyclodextrin at room temperature, high boiling points and low to moderate volatility, and have low olfactory detection thresholds. Highly water-soluble fragrances will not tend to form inclusion complexes with the hydrophobic cyclodextrin cavities. Likewise, inclusion complexes with very high equilibrium constants (strong binding) or really low equilibrium constants (weak binding) will not be useful. Those with very weak binding will not form inclusion complexes to begin with. Those with very high equilibrium constants will not be able to leave the cavity and diffuse to the surface of the polymer finished article. Fragrances with low boiling points will tend to evaporate from the polymer-cyclodextrin blend during processing and will be gone when the finished article is prepared. The olfactory detection threshold should be less than about 50 ppb so that the fragrance is detectable to the user. Relatively low levels of fragrance will be diffusing to the surface of the articles, so they must be detectable at low levels. Fragrances useful in this invention can be amyl cyanamid, benzyl salicylate, amyl cinnamic aldehyde, citral, benzophenone, cedrol, cedryl acetate, dihydroisojasmonate, diphenyl oxide, patchouli alcohol, musk ketone, and the like.

In yet another embodiment of the present invention the dispersed cyclodextrins and base polymer are first formed into the finished article. In this case inclusion complexes with the dispersed cyclodextrins are not prepared before the forming process. The finished article is then treated with the desired inclusion complex-forming component (e.g., dye, fragrance, anti-microbial, etc.) which adsorbs into the empty cyclodextrin cavity. The extent of complex formation will depend on variables such as the temperature, time, and concentration of complex-forming material. The resulting cyclodextrin-inclusion complex will primarily be on the surface of the article. The desired properties will then be imparted to the surface.

The following examples illustrate the various embodiments of the present invention. Those skilled in the art will recognize many variations that are within the spirit of the present invention and scope of the claims.

EXAMPLE 1

In this example, the cyclodextrin cavity is empty and the cyclodextrin has not yet formed an inclusion complex.

Part 1. Preparation of Microfine Acid Functionalized Polyethylene

A mixture of 454 grams of a precursor graft (HDPE grafted with 2 wt. % maleic anhydride ("MAH") having a melt index (MI) of 10 g/min (ASTM D1238-01, condition 190/2.16) and a melting point of 128° C.), 830 ml. of deionized water and 180 grams of nonionic surfactant (PLURONIC® F98) is charged to an autoclave reactor. The reactor comprises a cylindrical two liter, 4 inch internal diameter pressure vessel (Parr Instrument Company) equipped with a safety head, a thermowell, a pressure gauge, along with a stirrer bearing and shaft. Attached to the shaft are three impellers containing six equally spaced blades. The shaft is turned with a fractional horsepower electrical motor.

The reactor and its contents are heated to 215° C. and stirred at 1500 rpm to disperse the molten polymer in the aqueous medium. Stirring is continued for 5 minutes at 215° C. after which time heating was terminated. The reactor is emptied through an air actuated valve into a receiving vessel containing cold water. The resulting fine powder product is recovered by filtration of the slurry after thorough washing with ambient temperature deionized water. The powder cake is dried at room temperature under a constant air circulation for several days.

Part 2. Preparation of the Cyclodextrin-Grafted Polymer

A blend of beta-cyclodextrin powder and microfine acid-grafted polyethylene is prepared by mixing one pound of cyclodextrin and 49 pounds acid-grafted polyethylene in a Henschel mixer. The cyclodextrin powder is dried before blending in order to remove adsorbed water. Drying is accomplished in a vacuum oven at reduced pressure. The powders are blended under a dry nitrogen atmosphere until a homogeneous mixture is formed.

The powder mixture is then transferred to the hopper of a twin screw extruder which has a mixing section and a vacuum vent section. The two materials are then melt compounded. The extrusion temperature is about 170° C. The vacuum vent of the extruder is used to remove the water released during the compounding. The resulting cyclodextrin-grafted polyethylene is pelletized by passing the polymer melt through a die and into a water bath which freezes the polymer strand. Any residual water is removed and the strand is then cut into pellets.

Part 3. Preparation of a Finished Article

A film useful for removing off-taste components from the packaging of dry foods such as cereal is prepared by blending pellets of the cyclodextrin-grafted polyethylene to the unmodified polyethylene conventionally used for such packaging. A blend consisting of about 5% by weight of cyclodextrin-grafted polyethylene and about 95% by weight of Alathon® M6210 (a medium molecular weight high density polyethylene) is prepared by mixing the pellets and transferring the pellet mix to the hopper of a blown film extruder from which a film is produced.

EXAMPLE 2

The following example describes the preparation of a polymer blend consisting of polyethylene and a polymeric graft made from microfine acid-grafted polyethylene and beta-cyclodextrin-antimicrobial inclusion complex.

Part 1. Preparation of Cyclodextrin-Antimicrobial Inclusion Complex

A mixture consisting of about 500 grams of beta-cyclodextrin and about 500 ml of deionized water is prepared by mixing in a stainless steel 2-liter beaker equipped with a mechanical stirrer. The mixture is stirred until it has a uniform viscous slurry consistency. To this mixture about 127 grams of triclosan anti-bacterial agent are slowly added. Additional water is introduced to reduce the slurry viscosity and insure that the paste is uniform as the inclusion complex forms. The mixture is stirred for about one hour at room temperature to insure uniformity and to allow the inclusion complex to form. The mixture is then removed, transferred to large glass tray and allowed to dry in air at room temperature. The remaining water is removed by drying under vacuum at 40° C. The resulting solid is ground, washed with ether, filtered, and dried under vacuum to yield the cyclodextrin-triclosan inclusion complex.

Part 2. Preparation of the Cyclodextrin-Inclusion Complex-Grafted Polymer

A mixture of the beta-cyclodextrin-triclosan inclusion complex powder and microfine acid-grafted polyethylene is prepared analogously to Example 1. The powder mixture is then transferred to the hopper of a twin screw extruder which has a mixing section and a vacuum vent section. The two materials are then melt compounded. The extrusion temperature is kept at about 170° C. This temperature is sufficiently high to melt the acid-grafted polyethylene, convert the acid functionality back to the anhydride, and allow the anhydride functionality to react with hydroxyl groups on the cyclodextrin, yet not destroy the cyclodextrin-triclosan inclusion complex. The vacuum vent of the extruder is used to remove the water generated when the anhydride is formed from the acid. The resulting cyclodextrin-grafted polyethylene is pelletized by passing the polymer melt through a die and into a water bath which freezes the polymer strand. Any residual water is removed and the strand is cut into pellets of the desired size. The final pellets are dried under nitrogen.

Part 3. Preparation of a Finished Article

Finished articles with anti-microbial surfaces are preparing by injection molding the product. The articles are prepared by blending pellets of the cyclodextrin-grafted polyethylene with polyethylene. A blend consisting of about 5% by weight cyclodextrin-grafted polyethylene and about 95% by weight Alathono M5040 or Alathon® H5012 (an injection molding grade polyethylene) is prepared by mixing the pellets and transferring the pellet mix to the hopper of the extruder of an injection molding machine. The molded item is then produced by injection molding.

EXAMPLE 3

The following example describes the preparation of a polymer blend consisting of polyethylene and a polymeric graft made from microfine acid-grafted polyethylene and beta-cyclodextrin-fragrance inclusion complex.

Part 1. Preparation of Cyclodextrin-Fragrance Inclusion Complex

A mixture consisting of about 500 grams of beta-cyclodextrin and about 500 ml of deionized water is prepared by mixing in a stainless steel 2-liter beaker equipped with a mechanical stirrer. The mixture is stirred until it has a uniform viscous slurry consistency. To this mixture about 88 grams of amyl cinnamic aldehyde are slowly added. Additional water is added to reduce the slurry viscosity and insure that the paste is uniform as the inclusion complex forms. The mixture is stirred for about one hour at room temperature to insure uniformity and to allow the inclusion complex to form. The mixture is then removed, transferred to large glass tray and allowed to dry in air at room temperature. The remaining water is removed by drying under vacuum at 40° C. The resulting solid is then ground, washed with ether, filtered, and dried under vacuum to yield about 500 grams of the cyclodextrin-fragrance inclusion complex.

Part 2. Preparation of the Cyclodextrin-Inclusion Complex-Grafted Polymer

A mixture of the beta-cyclodextrin-fragrance inclusion complex powder and microfine acid-grafted polyethylene is prepared as described in Example 1. The powder mixture is transferred to the hopper of a twin screw extruder which has a mixing section and a vacuum vent section. The two materials are then melt compounded. The extrusion temperature is kept at a temperature of about 170° C. This temperature is sufficiently high to melt the acid-grafted polyethylene, convert the acid functionality back to the anhydride, and allow the anhydride functionality to react with hydroxyl groups on the cyclodextrin, yet not destroy the cyclodextrin-amyl cinnamic aldehyde inclusion complex. The vacuum vent of the extruder is used to remove the water generated when the anhydride is formed from the acid. The resulting cyclodextrin-grafted polyethylene is pelletized by passing the polymer melt through a die and into a water bath which freezes the polymer strand. Any residual water is removed and the strand can then be cut into pellets of the desired size. The final pellets are then further dried to ensure that residual water does not contaminate the product.

Part 3. Preparation of a Finished Article

A polymer product with a surface that has the odor of amyl cinnamic aldehyde and is useful for packaging films is prepared by blending pellets of the cyclodextrin-grafted polyethylene with polyethylene. A blend consisting of about 5% by weight of cyclodextrin-grafted polyethylene and about 95% by weight Equistar GA501 (a linear low density polyethylene) is prepared by mixing the pellets and transferring the pellet mix to the hopper of the blown film extruder. A film is then produced from the extruder.

EXAMPLE 4

The following example describes the preparation of a polymer blend consisting of polyethylene and a polymeric graft made from microfine acid-grafted polyethylene and beta-cyclodextrin-dye inclusion complex.

Part 1. Preparation of Cyclodextrin-Dye Inclusion Complex

A highly dispersed aqueous suspension of about 138 grams of Disperse Red 1 dye and about 500 ml of deionized water are prepared by mixing in a stainless steel 2-liter beaker equipped with a high shear mechanical stirrer. The mixture is stirred until the dye is uniformly dispersed in the water. To this mixture about 500 grams of beta-cyclodextrin are slowly added. Additional water is added to reduce the slurry viscosity and insure that the mixture is uniform as the inclusion complex forms. The mixture is stirred for about one hour at room temperature to insure uniformity and to allow the inclusion complex to form. The mixture is removed, transferred to large glass tray and allowed to dry in air at room temperature. The remaining water is removed by drying under vacuum at 40° C. The resulting solid is ground, washed with ether, filtered, and dried under vacuum to yield the cyclodextrin-dye inclusion complex.

Part 2. Preparation of the Cyclodextrin-Inclusion Complex-Grafted Polymer

A mixture of the beta-cyclodextrin-dye inclusion complex powder and microfine acid-grafted polyethylene is prepared as described in Example 1. The powder mixture is then transferred to the hopper of a twin screw extruder which has a mixing section and a vacuum vent section. The two materials are then melt compounded. The extrusion temperature is kept at about 170° C. This temperature is sufficiently high to melt the acid-grafted polyethylene, convert the acid functionality back to the anhydride, and allow the anhydride functionality to react with hydroxyl groups on the cyclodextrin, yet not destroy the cyclodextrin-dye inclusion complex. The vacuum vent of the extruder is used to remove the water generated when the anhydride is formed from the acid. The resulting cyclodextrin-grafted polyethylene is pelletized by passing the polymer melt through a die and into a water bath which freezes the polymer strand. Any residual water is removed and the strand cut into pellets. The final pellets are then further dried to ensure that residual water does not contaminate the product.

Part 3. Preparation of a Finished Article

A transparent film having the color of the disperse dye and useful for packaging can be prepared by blending pellets of the cyclodextrin-grafted polyethylene to polyethylene. A blend consisting of about 5% by weight of cyclodextrin-grafted polyethylene and about 95% by weight of Equistar GA501 (a linear low density polyethylene) is prepared by mixing the pellets and transferring the pellet mix to the hopper of the blown film extruder. A film is next produced from the extruder.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
   (a) reacting a grafted microfine polymer powder with a cyclodextrin to form a cyclodextrin-attached grafted polymer, the microfine polymer powder comprising particles such that 80% or more of the particles range in size from about 10 up to about 500 microns; and
   (b) dispersing the cyclodextrin-attached grafted polymer in a base polymer.

2. The method of claim 1 wherein the base polymer is selected from the group consisting of polyolefins, polystyrene, and mixtures thereof.

3. The method of claim 2 wherein the polyolefin is selected from the group consisting of homopolymers and copolymers of ethylene and propylene.

4. The method of claim 1 wherein from about 1 to about 30 percent by weight of the cyclodextrin-attached grafted polymer is dispersed in from about 99 to about 70 percent by weight of the base polymer.

5. The method of claim 1 wherein the grafted microfine polymer powder is a microfine polymer onto which an ethylenically unsaturated monomer has been grafted.

6. The method of claim 5 wherein the ethylenically unsaturated monomer is selected from the group consisting of unsaturated carboxylic acids, unsaturated carboxylic acid derivatives, unsaturated alkoxy silanes, and mixtures thereof.

7. The method of claim 6 wherein the ethylenically unsaturated monomer is maleic anhydride.

8. The method of claim 1 wherein the grafted microfine polymer powder is made by a process comprising:

(a) heating a mixture comprising a carboxylic acid-functionalized polyolefin, a nonionic surfactant, and a polar liquid medium containing at least 50 wt. % water to a temperature above the melting point of the polyolefin to form a dispersion of liquified polyolefin in the polar liquid medium; and
   (b) cooling the dispersion below the melting point of the polyolefin to produce a carboxylic acid-functionalized polyolefin powder.

9. The method of claim 8 wherein the weight ratio of polar liquid medium to grafted polyolefin is from 1:1 to 9:1 and the weight ratio of nonionic surfactant to grafted polyolefin is from 0.05:1 to 5:1.

10. The method of claim 9 wherein the grafted polyolefin is polyethylene grafted with from about 0.5 to about 5 wt. % maleic anhydride, and the nonionic surfactant is a block copolymer of ethylene oxide and propylene oxide.

11. The method of claim 10 wherein the grafted polyethylene is high density polyethylene (HDPE) or linear low density polyethylene (LLDPE) grafted with from about 1 to about 4 wt. % maleic anhydride.

12. The method of claim 11 wherein the grafted HDPE and LLDPE have a melt index (MI) from 5 to 2000 g/10 min.

13. The method of claim 10 wherein the nonionic surfactant contains at least 50 wt. % of ethylene oxide recurring units and has a number average molecular weight of at least 4500.

14. The method of claim 1 wherein the cyclodextrin is a cyclodextrin inclusion complex.

* * * * *